United States Patent Office 3,430,723
Patented Mar. 4, 1969

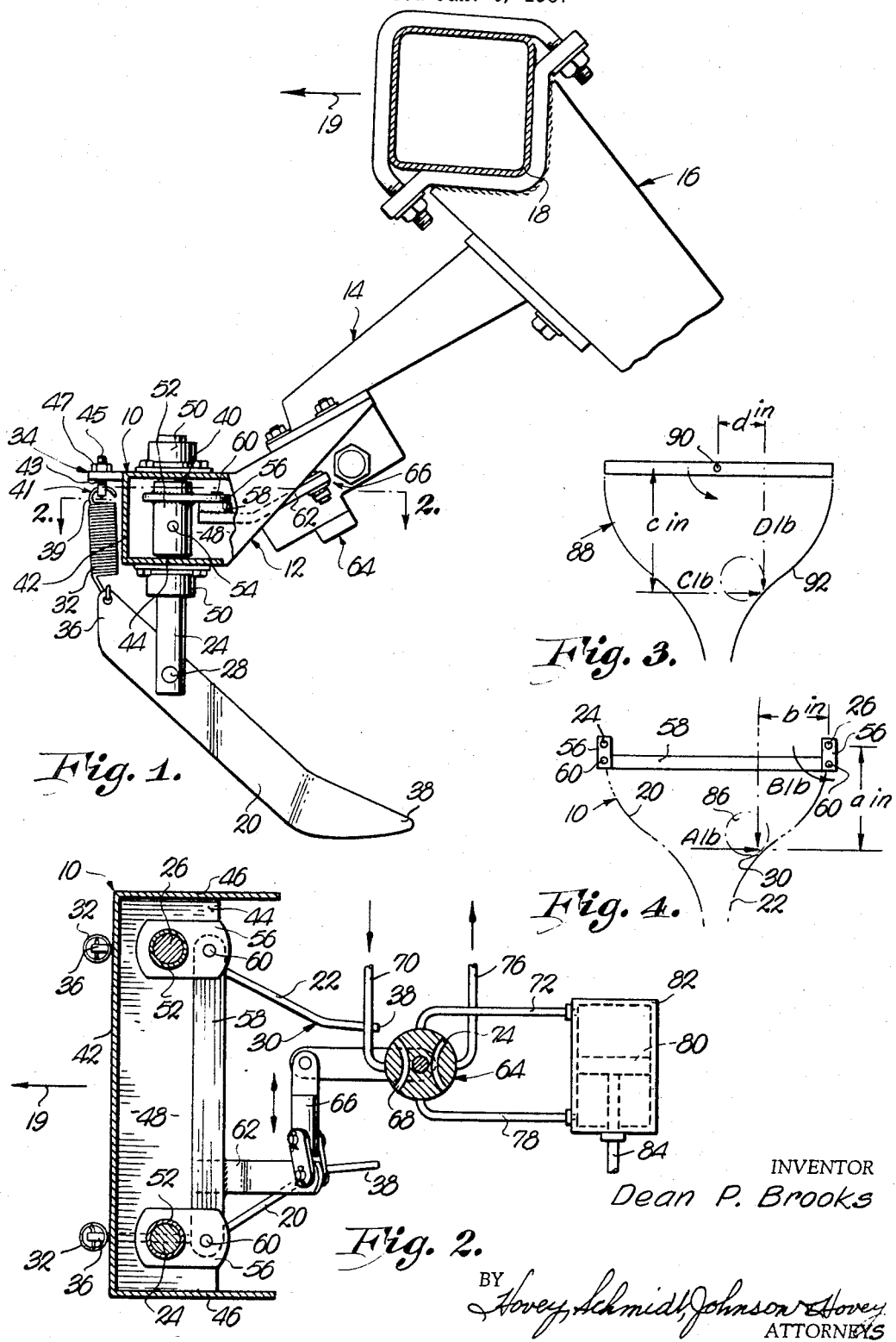

3,430,723
DOUBLE POST ROW FINDER
Dean P. Brooks, Newton, Kans., assignor to Hesston Corporation, Inc., Hesston, Kans., a corporation of Kansas
Filed Jan. 9, 1967, Ser. No. 608,183
U.S. Cl. 180—79
Int. Cl. A01b 3/64
6 Claims

ABSTRACT OF THE DISCLOSURE

A crop row finder having a pair of side-by-side crop detectors positioned for engaging crops in the row and being deflected thereby whenever the row finder is not aligned with the row. The row finder is adapted for association with the steering mechanism of a farm implement for operating the steering mechanism upon deflection of a detector to align the row finder and thus the implement with the row.

---

This invention relates to apparatus for aligning a farm implement with a crop row while the latter is being traversed by the implement, and particularly, to a crop row finder adapted for movement adjacent the row to detect misalignment of the implement by engaging and being deflected by crops of the row.

Farm implements such as sugar beet harvesters or the like generally employ harvesting or lifting wheels adapted for engaging opposite sides of beets or the like to lift the same from the ground. Implements having such wheels are fully disclosed in U.S. Letters Patent No. 2,993,548, which issued to Kiel on July 25, 1961, entitled, "Apparatus for Steering an Implement Along a Crop Row," and U.S. Letters Patent No. 3,183,976, which issued to Rollins on May 18, 1965, entitled, "Beet Row Finder and Steering Mechanism for Beet Harvesters," which patents are specifically adopted herein for reference. Such wheels engage and enter the ground adjacent opposite sides of the beet to force the latter out of the ground by contacting and camming upwardly on the lower arcuate surface of the same. Preferably, the wheels should be maintained in substantial alignment with the row so that individual beets are directed toward the nip between the wheels. Because of the nature of growing crops it is impractical to attempt to maintain the individual beets of a row in exact alignment with one another and, therefore, beet harvesters traditionally have steering mechanism which automatically, substantially aligns the harvester with the individual beets of the row as the latter is being traversed by the harvester.

Manifestly, a crop row finder is required for detecting the position of individual beets and substantially immediately thereafter operating the steering mechanism of the harvester to generally align the lifting wheels with the beet detected.

Row finders utilized in the past, such as the row finders disclosed in the above-referenced Kiel patent, include structural limitations which severely curtail their ability to function with maximum efficiency and accuracy. Manifestly, previously used row finders have required extremely long detectors. Long detectors are easily bent in response to deflection thereof by a beet and thus rendered inoperative to control the steering mechanism of the harvester. Generally, such row finders include control linkage which is actuated upon swinging of the detector about a pivot point in response to the deflection of the detector by contact with a beet. Therefore, in addition to the bending problem, the length of the detector necessarily decreases the arc through which the same is swung upon contact with a beet and, therefore, the control linkage and controls actuated thereby must be extremely sensitive to sense incremental swinging of the detector.

Thus, it is the primary object of the instant invention to provide a row finder for such farm implements wherein the length of the detector is decreased without loss of sensitivity whereby all of the problems associated with extremely long detectors are minimized, if not substantially eliminated completely.

Traditionally, row finders such as that disclosed in the Kiel patent mentioned above have utilized a single pivot post located between the detectors and thus, the deflecting force applied to a detector upon its engagement with a beet has vectors which cause counteracting torques to be applied to the pivot. The moment arm of the vector which is directed laterally of the path of travel of the implement must be sufficiently long to create enough torque to cause the detector to move laterally and thereby release the engaged beet.

It is a very important aim of the instant invention to provide a row finder wherein the detector pivots about a point disposed outwardly of the deflector whereby the vectors of the force applied thereto by contact with a beet result in additive torques whereby the length of the moment arm for the laterally directed vector and thus the length of the deflector itself, may be minimized.

Another very important object of the instant invention is to provide such a row finder having detectors disposed on opposite sides of the row and swingable about respective pivot points spaced outwardly of the row wherein the detectors are interconnected and coupled with a single, double-acting control, sensitive selectively outward to deflection of the detectors by a crop in the row.

In the drawing:

FIGURE 1 is a side elevational view of a crop row finder embodying the principles and concepts of the instant invention;

FIG. 2 is a sectional view taken along line 2—2 of FIG. 1, wherein the guiding mechanism control has been shown schematically; and FIGS. 3 and 4 are graphical representations of the inherent mechanical differences between a row finder embodying the concepts and principles of the instant invention (FIG. 4) and the row finders disclosed in the above-mentioned patents.

A row finder embodying the principles and concepts of the instant invention is illustrated in FIG. 1 and broadly denoted by the numeral 10. Row finder 10 includes a support frame 12 and a mounting bracket 14 for rigidly securing frame 12 to the lifter wheel support arm 16 carried by a frame member 18 of a farm implement such as a beet harvester or the like (not shown). It is to be understood that frame member 18 preferably extends transversely of the path of travel of the farm implement and is disposed forwardly thereon for travel in the direction of the arrow 19. In this respect, it is to be understood that the lifter wheels (not shown) are mounted at the lower end of arm 16.

Row finder 10 includes a pair of spaced, side-by-side detectors 20 and 22 which are mounted on the lower ends of respective elongated detector supporting shafts 24 and 26 by pivot means 28 for swinging about respective horizontal axes. Detectors 20 and 22 are disposed to extend along opposite sides of a crop row (not shown) and each has a crop-engaging inner surface 30. A pair of springs 32 extend between a mounting flange 34 on frame 12 and respective upper ends 36 of detectors 20 and 22 for biasing the latter in a clockwise direction (FIG. 1) around pivot means 28 to bias the lower edges of detectors 20 and 22 toward the ground.

The hook 39 of each spring 32 proximal flange 34 is received in the eye 41 of a respective stud 43 depending from flange 34. Each stud 43 extends through a corresponding aperture therefor in flange 34 presenting respective threaded portions 45 on the opposite side of flange 34 from hooks 39. A nut 47 is threadably received on each portion 45 respectively and it is to be noted that by rotating either nut 47 relative to its stud 43, the tension of the corresponding spring 32 is adjusted individually.

Frame 12 includes an upper wall 40, a side wall 42, a bottom wall 44, and end walls 46 which define a hollow chamber 48 within frame 12. Walls 40 and 44 extend between shafts 24 and 26 and therebeyond and mount respective upper and lower journal bearings 50 for each shaft 24, 26. Shafts 24 and 26 are received by a respective aligned pair of upper and lower bearings 50 and present therewith structure mounting respective detectors 20 and 22 for swinging about a respective upright axis located forwardly and outwardly of respective surfaces 30. In this respect, it is to be understood that detector 20 swings with shaft 24 about the upright, longitudinal axis of the latter, while detector 22 swings with shaft 26 about the longitudinal, upright axis of the same.

An annular sleeve 52 is mounted on each shaft 24, 26 coaxially therewith, within chamber 48. A bolt 54 extends through each sleeve 52 and its respective shaft 24, 26, rigidly interconnecting the same for rotation as a unit. Each sleeve 52 mounts an arm 56 for rotation therewith and it can be seen, viewing FIG. 2, that arms 56 extend from sleeves 52 laterally of the axis of shafts 24 and 26 and generally rearwardly therefrom.

A link 58 is pivotally mounted at opposite ends thereof by pivot means 60 to respective arms 56. A bent actuator bar 62 is rigid with link 58 for movement therewith and extends therefrom generally toward a control valve mechanism 64. It is to be understood that mechanism 64 is shown schematically in FIG. 2. Bar 62 is pivotally connected with the operator 66 of mechanism 64 and it can be seen schematically in FIG. 2 that when operator 66 is moved upwardly, port 68 of mechanism 64 will be rotated to intercommunicate fluid inlet line 70 and the upper cylinder line 72, while valve port 74 intercommunicates the fluid outlet line 76 and the lower cylinder line 78. Thus, the piston 80 of the implement direction control cylinder 82 will be moved downwardly. On the other hand, when operator 66 is moved downwardly, port 68 will intercommunicate inlet line 70 and cylinder line 78, while port 74 intercommunicates outlet 76 and cylinder line 72 and thus, piston 80 will be moved upwardly. Manifestly, the piston rod 84 rigid with piston 80 of cylinder 82 is connected with steering mechanism (not shown) for moving frame member 18 and arm 16 transversely of the path of travel of the implement to cause the lifter wheels at the lower end of arm 16 to move into alignment with a beet or other row crop contacted by detectors 20 and 22.

It is to be appreciated that link 58 interconnects shafts 24 and 26 so that detectors 20 and 22 swing together as a unit. Normally, the row of crops being followed will move between surfaces 30 of detectors 20 and 22. Whenever arm 16 and the lifter wheels thereon are out of alignment with the crop row, one of the surfaces 30 will be moved relatively toward the row, while the other surface 30 is moved relatively away from the row. The surface 30 which is moved toward the row will contact an individual crop of the row and be cammed or deflected outwardly thereby. Assuming that the surface 30 of detector 22 engages the individual crop, shaft 26 will be rotated in a counterclockwise direction (FIG. 2) and link 58 will cause shaft 24, and thereby detector 20, to likewise rotate in a counterclockwise direction. Link 58, of course, will be moved upwardly by this action to cause operator 66 to likewise move upwardly and thus, piston 80 will be caused to shift downwardly. Manifestly, downward movement of piston 80 will shift the farm implement in a direction to cause the crop row to be disposed generally centrally between the surfaces 30 of detectors 20 and 22.

Manifestly, because the tensions of springs 32 are individually adjustable, it is possible to cause one of the detectors 20, 22 to ride higher than the other detector. This may become necessary, for example, where the cultivation of the crop row was consistently off center. Furthermore, it may be desirable to set the detectors 20 and 22 at different heights when harvesting double or bed-row type plantings.

Viewing FIG. 4, the action of the row finder 10 of the instant invention is illustrated schematically. When the surface 30 of detector 22 contacts a beet 86, the force applied to surface 30 produces a pair of perpendicular force vectors A and B. Vector A acts upon shaft 26 through the moment arm $a$, while the vector B acts on shaft 26 through the moment arm $b$. The resultant moments $B \times b$ and $A \times a$ both act in a counterclockwise direction about the axis of shaft 26 and thus, the moments are additive. On the other hand, viewing FIG. 3, the action of prior art row finders is illustrated and vividly sets forth the primary advantage of a row finder such as 10 which embodies the principles and concepts of the instant invention. The prior art row finder 88 rotates as a unit about the axis of pivot shaft 90. The force vectors C and D applied to feeler 92 act respectively through the moment arms $c$ and $d$ about the axis of shaft 90. It is to be especially noted that the moment $C \times c$ acts in a counterclockwise direction around post 90, while the moment $D \times d$ is applied in a clockwise direction. Thus, the moments act opposite to one another and hence, moment $C \times c$ must exceed moment $D \times d$ in order for feeler 92 to be moved laterally and outwardly about shaft 90. Inherently, the moment arm $c$ must be sufficiently long to cause moment $C \times c$ to exceed moment $D \times d$ and supply sufficient excess moment to rotate the finder 88. Thus, feeler 92, by necessity, must be extremely long. On the other hand, viewing FIG. 4, it can be seen that the row finder 10 embodying the concepts and principles of the instant invention acts in a manner to apply torques $A \times c$ and $B \times b$ in the same direction about shaft 26 and thus, the moment arm $a$ can be held to a minimum. Thus, the row finder of the instant invention permits the use of comparatively very short detectors and yet extremely close control of mechanism 64 is achieved.

Having thus described the invention, what is claimed as new and desired to be secured by Letters Patent is:

1. In a farm implement having a direction control, a row finder comprising:
    a pair of detectors spaced to receive the row therebetween and provided with opposed, crop-engaging, inner surfaces;
    structure for each detector respectively mounting the same for swinging movement about an upright axis disposed forwardly and outwardly of its said surface; and
    mechanism for operably coupling said detectors with said direction control to render the latter responsive to swinging movement of the detectors incident to engagement of either of said surfaces with the crop, said mechanism including linkage interconnecting said structures for swinging movement of the detectors together as a unit whereby swinging of one detector responsive to engagement with the crop simultaneously swings the detector in the same direction to maintain the space between the detectors aligned with said row.

2. The invention of claim 1,
    each structure including an elongated, detector-supporting shaft having a vertical, longitudinal axis of rotation.

3. The invention of claim 2,
    said mechanism including linkage interconnecting said shafts for simultaneous rotation.

4. The invention of claim 1, each structure having means supporting its detector for swinging movement about an axis normal to its said upright axis.

5. The invention of claim 4,
and means coupled with each detector respectively for yieldably biasing the same toward the ground.

6. The invention of claim 5,
said means coupled with each detector including a spring for each detector, each spring having means for varying the tension thereof.

References Cited

UNITED STATES PATENTS

| | | | |
|---|---|---|---|
| 2,981,355 | 4/1961 | Rabuse | 172—5 X |
| 2,993,548 | 7/1961 | Kiel | 180—14 |
| 3,183,976 | 5/1965 | Rollins | 171—8 |

FOREIGN PATENTS 1,157,550  12/1957  France.

LEO FRIAGLIA, *Primary Examiner.*

J. A. PEKAR, *Assistant Examiner.*

U.S. Cl. X.R.

56—121.45; 171—55; 172—5